April 4, 1950 — A. RAVA — 2,502,887
RESISTANCE WELDING APPARATUS
Original Filed Oct. 11, 1940
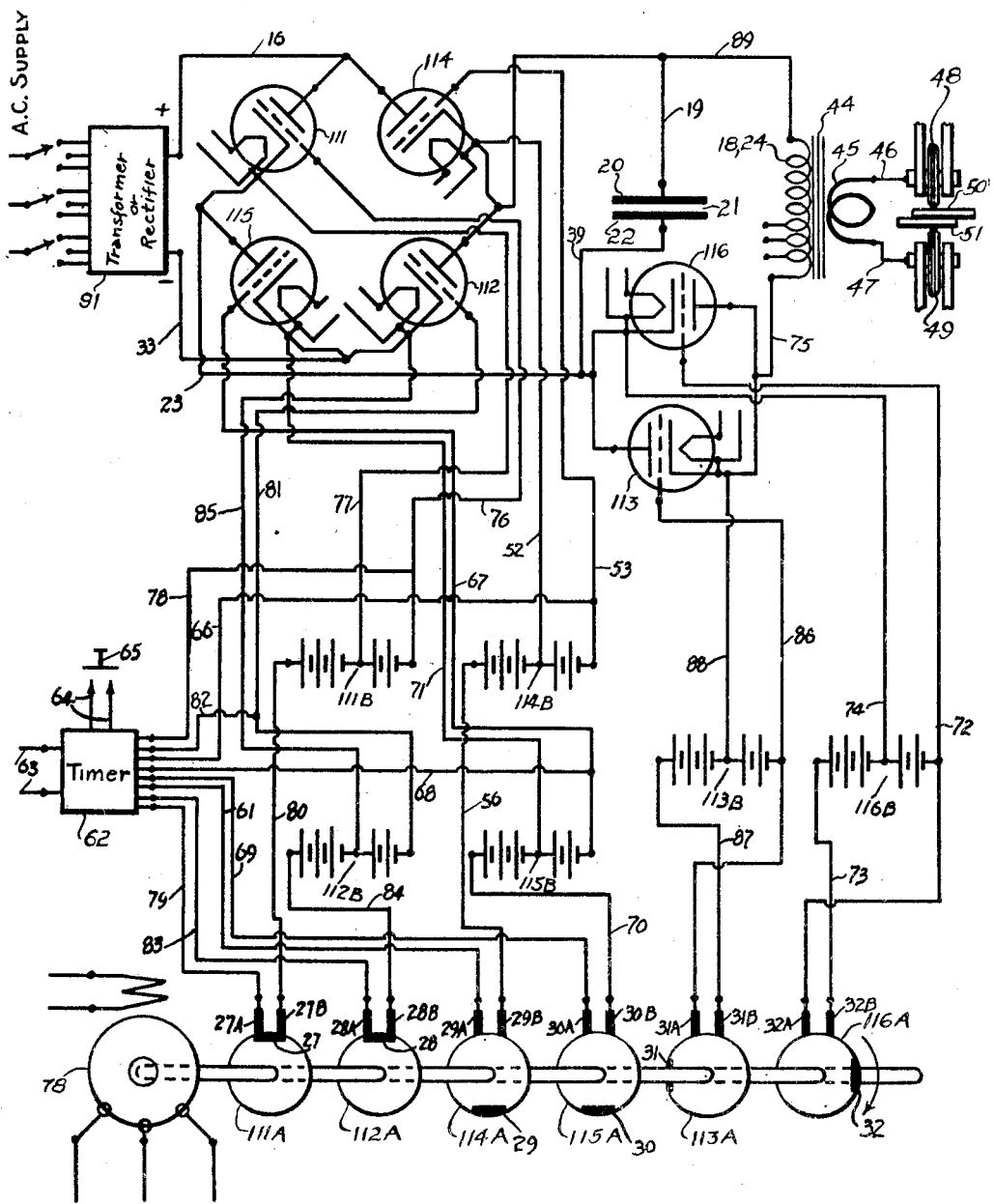
INVENTOR
ALEXANDER RAVA
By Darby & Darby
ATTORNEYS.

Patented Apr. 4, 1950

2,502,887

UNITED STATES PATENT OFFICE 2,502,887

RESISTANCE WELDING APPARATUS

Alexander Rava, Jersey City, N. J.

Original application October 11, 1940, Serial No. 360,721. Divided and this application September 19, 1941, Serial No. 411,514

7 Claims. (Cl. 219—4)

This application is a division of my copending application Serial No. 360,721, filed October 11, 1940, now abandoned.

This invention relates to a new and improved method and apparatus for resistance welding which employs a power condenser or capacitor in the primary circuit of a welding transformer for apportioning the energy to be applied to the work between the welding electrodes connected to the secondary of said transformer.

It has heretofore been suggested, for example in the Welding Journal for August 1935, in a paper by G. I. Babat, pages 6 to 8 inclusive, and in Sidney Patent No. 2,179,105, issued November 7, 1939, that a power condenser may be used in resistance welding, the power condenser to be first charged and then its energy released through the primary of a welding transformer. The present invention is an improvement on said prior system in respect to the cycle of operation, efficiency and consistency of performance.

A feature of my invention is the employment of a power condenser in conjunction with a welding transformer which permits surges of welding current to be delivered to said transformer alternately in opposite vectorial directions.

Another feature of my invention is the provision of a pair of controllable unidirectional devices in conjunction with a power condenser and a welding transformer which permit surges of current through said welding transformer alternately in opposite vectorial directions.

Another feature of my invention is the provision of means for adjusting, within very close limits but with wide latitude, the amplitude and duration of the welding current surges so that they may be adjusted to values closely commensurate with the physical properties and thicknesses of the work pieces being welded.

Another feature of my invention is the provision of means for extending the duration of the surges of welding current beyond limits possible with present systems, while adjusting the amplitude of the current to a desired value.

Another feature of my invention is the provision of means for insuring reliably consistent welding performance by reason of the symmetry and balance of the electrical circuits, and also by the provision of controlling means for the switching devices.

Another feature of my invention is the ability of my device to perform welding operations at greatly increased efficiency over the prior power condenser resistance welders.

Another feature of my invention is the provision of a power condenser welding circuit which permits the efficient utilization of a closed core welding transformer of suitable dimensions for optimum efficiency in the welding job to be performed.

Another feature of my invention is the ability of my welder to do seam welding as well as spot welding.

Another feature of my invention is the ability of my welder to weld work pieces of considerable difference in thickness as well as in composition and physical and metallurgical properties.

In the drawing, the figure shows a circuit diagram of an embodiment of my invention in which a power condenser is charged alternately to opposite polarity and in which surges of current are supplied to the primary of the welding transformer alternately in opposite vectorial directions during the discharge of the condenser.

There are shown in the drawings six gas-filled grid controlled rectifier tubes of the thyratron type, 111 to 116 inclusive, although any other type of tubes with controlled discharge, such as ignitrons, may likewise be used. Said tubes 111 to 116 serve as unidirectional switching devices, as will be explained. A plurality of sources of current, which are illustrated as batteries 111B to 116B, inclusive provide the respective grid voltages required for the control of these six tubes. A power condenser 21, which may be a bank of condensers in parallel, is connected effectively across the primary winding 18, 24 of a welding transformer 44, and in series with the tubes 113 and 116 which are poled to pass current in opposite directions when suitably energized.

A synchronous motor 78 drives a plurality of discs 111A to 116A having conductive inserts 27 to 32 adapted at properly timed intervals to make contact with brushes 27A, 27B, 28A, 28B, 29A, 29B, 30A, 30B, 31A, 31B, 32A and 32B, respectively, in order to apply at the suitable predetermined moments the desired grid voltage impulses to the tubes 111 to 116 for the purpose of actuating the respective discharges through them or "firing" them. A timer 82, run by current from the leads 63, having starter button 65 operating through leads 64, is provided to control the number of welding shots to be given the work per spot when the device is used for spot welding.

In the operation of the circuit shown in the drawing, a source of power will be connected to the transformer or rectifier 91, from a source marked "A. C. supply." Assuming that a transformer is used without a rectifier, then during a half cycle the lead 16 connected to the secondary of the transformer will be positive and the lead 32 negative, thus coinciding in vectorial direction with the forward voltage of the gas-filled grid controlled rectifier tubes 111 and 112. If now at a suitable preselected moment during this half cycle a proper voltage impulse is applied to the grids of tubes 111 and 112, in respect to their cathodes, thus making these tubes conductive or "firing" the same (and provided that the power condenser 21 has not any charge of equivalent potential but of opposite polarity), a current will flow from the secondary of the power transformer through lead 16, tube 111, and leads 23 and 39 to the plate 22 of the power condenser 21, and from the plate 20 of said condenser through lead 19, tube 112, and lead 33 back to the opposite terminal of the power transformer 91. Said current will result in charging said power condenser 21. Said "firing" grid voltage impulse in the tubes 111 and 112 are produced when the copper inserts 27 and 28 are in contact simultaneously with brushes 27A, 27B, and 28A and 28B, respectively, as illustrated in the drawing. It will be noted that when either of these brushes is not in contact with said copper inserts, a circuit may be traced, for example, from the grid of tube 111 through lead 76 to the negative terminal of battery 111B, thence to the intermediate terminal of that battery and through lead 77 to the cathode of tube 111. A similar circuit may be traced from the grid and cathode of tube 112 to the battery 112B. Thus there will be during the greater part of each revolution of the discs 111A and 112A a negative bias on the grids of tubes 111 and 112 in respect to their cathodes, preventing flow of current through said tubes.

At the instant we are now considering, when brushes 27A and 27B, and 28A and 28B make a simultaneous contact with their respective copper inserts 27 and 28, a circuit may be traced, for example, from the grid of tube 111 through leads 76 and 78 to the timer 62 where contact will be made between the leads 78 and 79, provided button 65 is pushed down to make contact with leads 64, so that the circuit may continue to be traced from lead 79 to brush 27A, insert 27, brush 27B, and lead 80 to the extreme positive terminal of battery 111B, thence through the left portion of that battery and through lead 77 to the cathode of tube 111. The synchronous motor 78 and the conductive insert 27 will be so adjusted that brushes 27A and 27B make contact with insert 27 at a desired predetermined moment, which, according to selection, may be set to occur prior to the peak positive voltage on the secondary of transformer 91, or at its peak, or again at any time during the decline of said positive voltage. The above adjustment is one of several effective means for regulation of energy used for welding, any given setting in regard to voltage conditions remaining constant during operation, since the peripheral velocity of disc 111A, driven by synchronous motor 78 is in step with the speed of voltage alternations and in step with the secondary of power transformer 91. It will be understood, of course, that a similar circuit is completed from the grid of tube 112 through leads 81 and 82, to the timer where contact is made between leads 82 and 83, and through the brushes on disc 112A through lead 70, battery 112B, and lead 85 to the cathode of tube 112, to fire that tube simultaneously with the firing of tube 111 and in the same manner.

Because the peripheral extension of the conductive inserts 27 and 28 are but a small fraction of the total periphery of discs 111A and 112A, and because the brushes 27A and 27B and 28A and 28B are mounted in close proximity to each other, the span of time during which said brushes are simultaneously in contact with said inserts is rather small in comparison with the time required for one complete revolution of the discs, which, of course, constitutes the cycle of operation. It is evident, therefore, that the positive voltage impulse produced by batteries 111B and 112B on the grids of tubes 111 and 112 is of very small duration, said grids being maintained during the rest of the cycle of operation at a negative potential with respect to their cathodes by said batteries.

Thus the grids of tubes 111 and 112 are ready to resume control almost immediately after receiving the positive impulse which induced the flow of current through said tubes. However, said control is actually regained by the grids only after the current flow between the anodes and cathodes of said tubes comes to an end. This happens when the voltage on the terminals of power condenser 21, due to the increasing charge on its plates 20 and 22, balances the voltage of the secondary of the power supply transformer 91. The current in the circuit through tubes 111, 112 and power condenser 21, then ceases to flow, thus allowing the grids of the tubes 111 and 112 to regain their control.

The time required for the above charging of power condenser 21 depends upon the electrical parameters of the charging circuit. In smaller units said charging time may be only a few hundred micro-seconds, whereas large welders may require 5000 or more micro-seconds.

After a suitable period or pause, the duration of which may be selected as $1/120$ of a second after tubes 111 and 112 cease firing in case the power transformer 91 is used, the tube 113 will be fired. It will be noted that this tube normally has a negative bias on its grid from battery 113B which may be traced similarly to battery 111B. When the tube 113 is to be fired, the copper insert 31 will be moved to a position where it is in contact with the brushes 31A, 31B, and will apply a positive potential to the grid of tube 113 from the left hand portion of battery 113B through the leads 86, 87, copper insert 31 and brushes 31A and 31B. At the instant when the brushes 31A and 31B make contact simultaneously with the insert 31, thus permitting a positive voltage on the grid of tube 113, tube 113 will fire, permitting discharge of the power condenser 21 through a circuit which may be traced from plate 22, through lead 39, tube 113, lead 75, primary winding 18, 24 and leads 89 and 19 to the plate 20 of condenser 21.

During this discharge of current from condenser 21, the current through the primary winding 18, 24 of the welding transformer will induce a current in the secondary 45 thereof which will be applied by the leads 46, 47 to the electrodes 48 and 49 and thence to the work 50, 51 giving a welding current impulse.

The duration of the power condenser discharge depends upon the electrical parameters of the discharge circuit, and, subject to the values involved, has a range from about 200 micro-seconds to 5000 or more micro-seconds. In general the discharge time tends to be shorter than the charging time because the charging circuit by its very nature has to contain an indispensable source of energy, the internal impedance of which is an added factor in the charging circuit.

Shortly after the positive grid voltage impulse initiating the firing of the discharge tube 113 is made, the brushes 31A and 31B will cease making the simultaneous contact with copper insert 31, and a negative bias will be restored to the grid of tube 113 from the battery 113B. However, said grid of tube 113 will regain its actual control and bar any further unwanted renewal of discharge through tube 113 only after the potential difference between the anode and cathode of said tube has sunk during the discharge of the power condenser 21 to less than the internal arc drop (which has a normal range of approximately 5 to 25 volts) of tube 113.

Although during the course of the discharge operation the voltage between the terminals of the power condenser 21 will, after a rapid decline, reach zero in a very short time (approximately a few hundred micro-seconds), the current in the discharge circuit 39, 113, 75, 18, 24, 89 and 19 will still continue to flow for some time (for about a few ten or even hundreds microseconds), with a rapidly diminishing intensity in the same vectorial direction as the current originally caused by the fully charged power condenser 21.

This lagging of the current, following the well known Lenz's law, is due to the potential difference of concurring vectorial direction between the terminal leads 75 and 89 of the primary by the still collapsing magnetic field of the welding transformer 44, which thus is assuming now for a brief period the role of an energy source. Since, according to Lenz's law, said potential difference has the same vectorial direction as the original potential difference between the plates 20 and 22 of the power condenser 21 (plate 22 being positive with respect to plate 20), at the beginning of its discharge, the resultant potential difference beween the terminal leads 75 and 89 will also have the same vectorial direction, that is, 75 will still be positive with respect to 89 during and for some time after the rapidly declining charge of condenser 21 is completely exhausted, and thus the formerly positive potential difference between 20 and 22 is equal to zero.

Due to the above-mentioned persistence of positive potential of 75 with respect to 19 the anode of tube 113 will also persist in remaining positive in respect to its cathode, with the result that despite the fact that the grid of tube 113 has already been made negative in respect to its cathode by the rotary motion of disc 113A, disengaging the simultaneous contact of brushes 31A and 31B with conductive insert 31, a current will be passing through said tube 113 during and for some time after the positive potential of plate 22 in respect to plate 20 of condenser 21 declines to zero, thus pumping into the power condenser 21 by the action of the collapsing magnetic field of the welding transformer, by now empty of the original charge, an electric charge of a polarity inverse to that of the original charge. Said charge of inverse potential of condenser 21, depending upon the values of the electrical parameters of the discharge circuit 22, 39, 113, 75, 18, 24, 89, 19, may reach 15, 25 or more percent of the original charge of said condenser 21.

Such energy of inverse potential stored in condenser 21 remains trapped therein due to the valve action of tube 113 which bars any current surges of inverse direction from its cathode to its anode. The tube 116, which is in parallel with tube 113, also bars any current surges of inverse direction by reason of the fact that it is not in firing condition at the proper time to permit such surges to pass.

During the next half cycle of current in the power transformer 91, the lead 16 connected to the secondary of the transformer is again positive and the lead 32 negative, thus coinciding in vectorial direction with the forward voltage of the gas-filled grid-controlled rectifier tubes 114 and 115. If now at a suitable preselected moment during this forward half cycle a proper voltage impulse is applied to the grids of tubes 114 and 115, in respect to their cathodes, thus making these tubes conductive or "firing" the same, a current will flow from the secondary of the power transformer through lead 16, tube 114, and lead 19 to the plate 20 of the power condenser 21, and from the plate 22 of said condenser through leads 39 and 23, tube 115, and lead 33 back to the opposite terminal of the power transformer 91. Said current will result in charging said power condenser 21. Said "firing" grid voltage impulse in the tubes 114 and 115 are produced when the copper inserts 29 and 30 are in contact simultaneously with brushes 29A, 29B, and 30A and 30B, respectively. It will be noted that when either of these brushes is not in contact with said copper inserts, a circuit may be traced, for example, from the grid of tube 114 through lead 53 to the negative terminal of battery 114B, thence to the intermediate terminal of that battery and through lead 52 to the cathode of tube 114. A similar circuit may be traced from the grid and cathode of tube 115 to the battery 115B through leads 67 and 71, and it will be noted that due to the position of the copper inserts 29 and 30 the two tubes 114 and 115 will fire simultaneously. Thus there will be during the greater part of each revolution of the discs 114A and 115B a negative bias on the grids of tubes 114 and 115 in respect to their cathodes, preventing flow of current through said tubes.

At the instant we are now considering, when brushes 29A and 29B and 30A and 30B make a simultaneous contact with their respective copper inserts 29 and 30, a circuit may be traced, for example, from the grid of tube 114 through leads 53 and 66 to the timer 62 where contact will be made between the leads 66 and 61, provided button 65 is pushed down to make contact with leads 64, so that the circuit may continue to be traced from lead 61 to brush 29A, insert 29, brush 29B, and lead 56 to the extreme positive terminal of battery 114B, thence through the left portion of that battery and through lead 52 to the cathode of tube 114. The synchronous motor 78 and the contact means 29 will be so adjusted that brushes 29A and 29B make contact with insert 29 at a desired predetermined moment, which according to selection may be set to occur prior to the peak positive voltage on the secondary of transformer 91, or at its peak, or again at any time during the decline of said positive voltage.

The above adjustment is one of several effective means for regulation of energy used for welding, any given setting in regard to voltage conditions remaining constant during operation, since the peripheral velocity of discs 114A and 115A, driven by synchronous motor 78, are in step with the speed of voltage alternations and in step with the secondary of power transformer 91. It will be understood, of course, that a similar circuit is completed from the grid of tube 115 through leads 67 and 68 to the timer, where contact is made between leads 68 and 69, and through the brushes on disc 115A through lead 70, battery 115B, and lead 71 to the cathode of tube 115, to fire that tube simultaneously with the firing of tube 114 and in the same manner.

Because the peripheral extension of the conductive inserts 29 and 30 are but a small fraction of the total periphery of discs 114A and 115A, and because the brushes 29A and 29B and 30A and 30B are mounted in close proximity to each other, the span of time during which said brushes are simultaneously in contact with said inserts is rather small in comparison with the time required for one complete revolution of the discs, which, of course, constitutes the cycle of operation. It is evident, therefore, that the positive voltage impulse produced by batteries 114B and 115B on the grids of tubes 114 and 115 is of very small duration, said grids being maintained during the rest of the cycle of operation at a negative potential with respect to their cathodes by said batteries.

Thus the grids of tubes 114 and 115 are ready to resume control almost immediately after receiving the positive impulse which induced the flow of current through said tubes. However, said control is actually regained by the grids only after the current flow between the anodes and cathodes of said tubes comes to an end, exactly as in the case of tubes 111 and 112. This happens when the voltage on the terminals of power condenser 21, due to the increasing charge on its plates 20 and 22, balances the voltage of the secondary of the power supply transformer 91. The current in the circuit through tubes 114, 115 and power condenser 21, then ceases to flow, thus allowing the grids and the tubes 114 and 115 to regain their control.

The time required for the above charging of power condenser 21 depends upon the electrical parameters of the charging circuit, as has been explained before.

After a suitable period or pause, the duration of which may be selected as 1/120 of a second after tubes 114 and 115 cease firing in case the power transformer 91 is used, the tube 116 will be fired. It will be noted that this tube normally has a negative bias on its grid from battery 116B through leads 72 and 74, which may be traced similarly to tube 113. When the tube 116 is to be fired, the copper insert 32 will have arrived at a position where it is in contact with the brushes 32A and 32B, and will apply a positive potential to the grid of tube 116 from the left hand portion of battery 116B through the leads 72, 73, 74, copper insert 32, and brushes 32A and 32B. At the instant when the brushes 32A and 32B make contact simultaneously with the insert 32, thus permitting a positive voltage on the grid of tube 116, tube 116 will fire permitting discharge of the power condenser 21 through a circuit which may be traced from plate 20, through leads 19 and 89, primary winding 18, 24, lead 75, tube 116, and lead 39 to the plate 22 of condenser 21.

During this discharge of current from condenser 21, the current through the primary winding 18, 24 of the welding transformer will induce a current in the secondary 45 thereof which will be applied by the leads 46, 47 to the electrodes 48 and 49 and thence to the work 50, 51, giving a second welding current impulse.

The duration of the power condenser discharge depends upon the electrical parameters of the discharge circuit, as previously explained.

Shortly after the positive grid voltage impulse initiating the firing of the discharge tube is made, the brushes 32A and 32B will cease making the simultaneous contact with copper insert 32, and a negative bias will be restored to the grid of tube 116 from the battery 116B. However, said grid of tube 116 will regain its actual control and bar any further unwanted renewal of discharge through tube 116 only after the potential difference between the anode and cathode of said tube has sunk during the discharge of the power condenser 21 to less than the internal arc drop (which has a normal range of approximately 5 to 25 volts) of tube 116, as in the case of tube 113.

The discharge of the condenser 21, of which plate 20 is now positive, through the welding transformer primary 18, 24 and tube 116, is exactly similar to the discharge of the condenser 21, when plate 22 is positive, through tube 113 and welding transformer primary 18, 24, except that the current is in the opposite vectorial direction. Thus the reverse charge built up in the condenser 21 in the course of the collapse of the magnetic field in the welding transformer primary 18, 24, will now make plate 22 of condenser 21 positive. This charge is as much as 25 or more percent of the original condenser charge.

Such energy of inverse potential stored in condenser 21, as explained in connection with the discharge through tube 113, remains trapped therein due to the valve action of tube 116 which bars any current surges of inverse direction from its cathode to its anode. The tube 113, which is in parallel with tube 116, also bars any current surges of inverse direction by reason of the fact that it is not in firing condition at the proper time to permit such surges to pass.

One full cycle of operation has now been described, and such cycle may, of course, be repeated as often as desired.

In general the currents and voltages in condenser charging circuits, as well as in discharging circuits, have either aperiodic or oscillatory characters depending upon the relations between the electrical parameters of the respective circuits. Since the grids of the grid controlled gas-filled rectifier tubes which may be used in such circuits for unidirectional switching operations can regain their controls only at such times when there is no current flowing through such tubes, it is obvious that the electrical parameters of the condenser charging or condenser discharging circuits should be so selected that the resulting charging or discharging currents, respectively, will have oscillatory characters only. This condition is satisfied by making the resistance of each of the charging and discharging circuits respectively as low as possible in order to satisfy in each case the relation that the square of the resistance parameter of the particular circuit shall be less than four times the ratio of the inductive to the capacitive parameters of said circuit.

It will be noted that the successive surges of welding current pass through the primary of the welding transformer in opposite vectorial directions. This symmetry of successive surges produces a flux density in the welding transformer which is equal and opposite during successive welding current surges. This not only produces a welding current in the secondary of the same amplitude and duration, but avoids misuse and abuse of the welding transformer. This permits the employment of an efficient, normally dimensioned closed core welding transformer. In the case of welding transformers used with resistance welders employing power condenser discharge of the prior art, where all surges of current were in the same direction, the core of the transformer would become highly magnetized and would be very inefficient in operation, as it could operate only on the upper end of the magnetizing curve. This required the use of over-sized iron cores, or iron cores provided with air gaps, which resulted in a considerable decrease in transformer efficiency. An important disadvantage of such prior art structures was that the welding results were inconsistent. That is, successive welds on the same work pieces from the same welding circuit through the same welding transformer, which should have produced identical welding results, would produce welds which in one case might be very satisfactory and the next succeeding weld might be totally unsatisfactory. This disadvantage is completely overcome by my apparatus in which the current through the welding transformer is alternately in opposite vectorial directions, as this permits reliably consistent results from each welding current impulse. The magnetization of the core in one direction by the discharge current from condenser 21 is overcome by the following surge of discharging current in the opposite direction, just as occurs in any transformer in an alternating current line.

My apparatus has an efficiency approximately double that of prior power condenser resistance welders. This results not only from the improved efficiency of the welding transformer just discussed, but from other reasons as well. I not only utilize the collapsing field of the transformer 44 to continue supplying welding current to the work, but also to store up power in the inverse direction in the condenser 21, where that power assists the succeeding surge of charging current instead of opposing it as in prior devices. Thus I not only eliminate a residual charge which may be as high as 25% or more, which needs to be overcome in prior devices, but utilize this in a beneficial way. I therefore require only about half the current from the power mains for the same amount of welding current supplied to the work. Furthermore, with my invention I can do seam welding and this is an important use of my invention. It has not been found possible to do seam welding with prior power condenser resistance welders.

There is a tendency with prior apparatus for the current and heat to spread, and such spread of current and heat may change the microstructure of the surrounding parts and the physical properties of the work may therefore be altered so that they do not have the desired qualities. Stainless steel and high carbon steel, for example, are very sensitive to overheating. Stainless steel may, in fact, be changed to non-stainless steel if overheated. Aluminum, aluminum alloys, copper and copper alloys will become brittle if overheated, and may burn without producing a real forged union at the spot regardless of the pressure. Aluminum is plastic over a very limited temperature range. Where an attempt is made to weld aluminum over a period requiring longer or repeated application of heat, the tendency to produce a burning or overheating close to the electrodes is pronounced. In the case of welds requiring a number of welding current surges, therefore, in my apparatus these disadvantages are overcome because each welding current surge is completed before the heat or current can spread sufficiently to have these undesired results.

With a power condenser welder the voltage applied to the work may be as high as 100 volts and consequently sufficient potential difference between the electrode tips is available to overcome dirt or oxide films which may be present. Thus excessive pressure is never necessary, which pressure might cause undesired bulging or indentations.

I prefer to use a D. C. excitation for the synchronous motor 78 when a power transformer 91 is used, in order to assure synchronization of the discs 111A to 116A with the power source, so that I may effect the charge and discharge of the condenser 21 always at exactly the same time with respect to the phase of current in the secondary of the power transformer.

Although electrical means may be employed to fire the switching tubes 111 to 116, provided adequate electrical precautions are taken, I have found that it is highly desirable, if not essential, unless the electrical precautions are elaborate, that mechanical control be used for most efficient and consistent results. I accordingly employ the contact discs 111A to 116A run by the synchronous motor with the copper inserts 27 to 32 and the brushes 27A to 32B. This makes the timing of my apparatus much more certain, avoids electrical difficulties in the welding due to disturbances from the controlling circuit, and therefore assures electrical symmetry in the welding circuit. It also avoids disturbances from the welding circuit to the electrical controls, which disturbances might shift the time of firing or cut off the tubes to such an extent as to cause this firing or cut off to occur at the wrong time in the welding cycle, or to cause it to occur for too short, too long, or uneven intervals during successive charges of the condenser and welding current surges.

In designing the transformers to be used in my welder, the customary mathematical solution of circuit equations expressed by a number of simultaneous differential equations does not produce sufficient accuracy because big changes in the iron cored inductances cannot be sufficiently taken into account. Under ordinary circumstances inductances would be assumed as constants in such a mathematical analysis. It is therefore necessary in designing my circuits to take into account the changes in the magnetic circuits of the power supply transformer 91, as well as the welding transformer 44, by applying a step by step method of mathematical analysis, the equivalent frequency of the charging and discharging surges being taken into account. This equivalent frequency may range from 500 to 1500 cycles per second, or higher.

It may be desirable in some circumstances to provide a time interval longer than $1/120$ of a second between successive charging and discharging of the condenser 21. For example a machine of very large kv.-a. rating might require iron cored transformers of such size that the charging surge and discharging surge would not be completed in a short enough time and might even partially overlap. Also different types of control tubes have different characteristics. In xenon-filled tubes, for example, de-ionization occurs very quickly so that the grid may regain control in a very short time. In mercury-filled tubes, however, de-ionization occurs more slowly, depending upon the ambient temperature, so that if mercury vapor tubes should be used a longer pause might be necessary. If for any reason such a longer pause is desired, this may be accomplished very simply by providing reduction gearing between the synchronous motor 78 and the discs 111A to 116A. For example, these discs might be rotated only once for each two or more cycles of current from the power mains. Let us assume, for example, that it is desired to rotate the discs only once for each five cycles. The reduction gearing would then be five to one. The tubes 111 and 112 would be fired and the condenser 21 charged during a portion of half of a cycle of the power supply. There would then be a pause for two and one-half cycles of the power supply, or for 1/24 of a second, before the firing of the tube 113. After another pause of 1/24 of a second the condenser 21 would again be charged through the tubes 114 and 115, and after another equal pause the tube 116 would be fired again to discharge the condenser 21.

In the event I employ a rectifier 91, the timing of the charge and discharge of the condenser 21 and the duration of the welding current surges may likewise be adjusted as just described in connection with the use of a power transformer 91. However, the use of power rectifier 91 permits some latitude of adjustments that is not present in the case of a power transformer since the intervals between the times of charge of condenser 21 are not dependent upon the frequency of the power source. Consequently with a power rectifier 91 I may space my surges of welding current closer together than with a power transformer 91, depending upon the work to be done. I may also space the welding current surges at intervals which are not multiples of the frequency of the current from the power mains.

There is another important advantage in the use of a power rectifier, namely that it provides an equally distributed load on the power mains. It also provides a decreased impedance in the charging circuit because the rectifier may employ a six or twelve phase rectifier transformer with a corresponding number of rectifier tubes which at any moment are acting partially in parallel and thus reduce the output impedance of such rectifier unit.

Since with a power rectifier 91 the timing is not dependent upon the frequency of the power supply, I may employ any type of constant speed motor to drive the discs 111A to 116A instead of a synchronous motor with D. C. excitation, as illustrated in the drawing. Such a substituted constant speed motor might be a D. C. shunt motor equipped with a governor control, and may of course have the motor speed adjustable.

Although I have illustrated the welding electrodes 48 and 49 as rollers for seam welding, I may of course use fixed electrodes for spot welding.

The requirements as to the electrical parameters of the circuits shown will be understood from the following values given for a welder of 5 kv.-a. rating with a circuit in accordance with the drawing.

Frequency of the A. C. power supply—60 cycles per second.

Rating of the power transformer 91—5 kv.-a. with a 440 volt primary and a tapped secondary providing voltages from 100 volts in steps of 25 upwards to 500 volts. The secondary may be over-sized in order to cut down its resistance approximately 25%.

The primary of the welding transformer may consist of two symmetrically located groups of coils. Each group may consist of four coils, adequately insulated from each other and from the core, of nine turns each of No. 6 gauge copper conductor. The secondary may consist of two single turn coils of laminated copper connected in parallel having a width each of 1.875 inches and a cross-sectional copper area of .6 square inch each. The core of the transformer should be laminated and closed and may be of a shell type, the central leg having a cross-section of 1¾ x 3 inches, or 5¼ square inches.

The condenser 21 may consist of several units having a total capacity of 112.5 microfarads, with taps for each 12.5 microfarads, thus providing means for varying the capacity by using more or less of these units.

The tubes 111, 112, 114 and 115 may be krypton-filled grid controlled tubes of Electrons, Inc., No. C6C. The rectifiers 113 and 116 may be the same with the grids tied through 20,000 ohm resistors to the respective cathodes.

The rectifier 91 may be of any suitable type but preferably comprises a 6 phase transformer equipped with 6 rectifying tubes, and in case of 30 kv.-a. may consist of C6D type krypton-filled grid controlled tubes manufactured by Electrons, Inc.

The voltage of the right hand portion of batteries 111B to 116B may be between 25 to 35 volts, and in the left hand portion may be between 10 and 25 volts.

In practice all of the battery voltages would normally be obtained by the use of rectifiers and potentiometers, the batteries being shown to simplify the diagram.

In the case of a 15 kv.-a. welding machine, the welding transformer primary may consist of 160 turns total, wound in two coils of 80 turns each. Each coil may consist of four sections of 20 turns each. When all sections are connected in parallel, the active primary turns will be 20. The secondary may consist of two coils of one turn each connected in parallel. Each primary conductor may be .162 x .325 inch of bare copper. The cross-section of each of the laminated secondaries may be 1.98 square inches. The core may be of a laminated shell type and the net cross-section of the center leg of said core may be 21.9 square inches with a total weight of the core of about 230 pounds. The condenser 21 may consist of a bank of condensers connected in parallel, having a total capacity of 150 microfarads arranged with taps to permit use of less than the total capacity when the machine is used at less power, or to regulate the performance for the particular job being done and the values of other electrical parameters. C6C tubes have been found satisfactory for 15 kv.-a., although a larger type C6D may be used to advantage.

The secondary voltage of the power transformer 91 may be about 1000 volts R. M. S., the secondary being provided with taps of 100 volts each and the secondary conductor being about 25% over-sized to cut down the resistance and thus reduce the secondary impedance.

From the above description it will be apparent that this invention resides in certain principles of construction and operation as illustrated in the drawing. It is recognized that those skilled in the art may readily vary the application of these principles and the structure by which they are applied without departure from the scope of this invention. I do not, therefore, desire to be

What is claimed:

1. A resistance welder comprising a circuit including a welding transformer, an energy storing device, a power transformer, means for successively charging said device alternately to opposite polarity from said power transformer, means for discharging said device by surges of current alternately in opposite vectorial directions through the primary of said welding transformer in timed relation with phase of voltage in said power transformer, and unidirectional means effecting inverse charging of said device during the collapse of the magnetic field in said welding transformer.

2. A resistance welder comprising a circuit including a welding transformer, an energy storing device, a source of direct current, a plurality of gas-filled controlled rectifier type tubes arranged in a bridge connection, means for alternately firing pairs of said tubes simultaneously to charge said device alternately to opposite polarity from said current source, a pair of additional gas-filled controlled rectifier type tubes, means for alternately firing said additional tubes to discharge said device by surges of current alternately in opposite vectorial directions through the primary of said welding transformer and to charge said device inversely during the collapse of the magnetic field in said welding transformer.

3. A resistance welder comprising a circuit including a welding transformer, an energy storing device, a source of current, means for charging said device alternately to opposite polarity from said current source, means for releasing surges of energy from said device alternately in opposite vectorial directions through the primary of said welding transformer, and uni-directional means effecting inverse charging of said device during the collapse of the magnetic field in said welding transformer.

4. A resistance welder comprising a circuit including a welding transformer, an energy storing device connected effectively to the primary of said transformer, a source of current, means for successively charging said device to opposite polarity from said current source, means for successively discharging said device in opposite vectorial directions through the primary of said welding transformer, and means effecting a surge of useful energy into said device during the collapse of the magnetic field in said welding transformer following each discharge of said device therethrough.

5. A resistance welder comprising a circuit including a welding transformer, an energy storing device, a source of current, means for successively charging said device from said current source, means for successively discharging said device alternately in opposite vectorial directions through the primary of said welding transformer, and means effecting inverse charging of said device during the collapse of the magnetic field in said welding transformer following each discharge of said device therethrough.

6. A resistance welder comprising a circuit including a welding transformer, an energy storing device, a source of current, means for successively charging said device from said current source, and switching means in series with said welding transformer primary during the discharge of said device, operating in timed relation with maximum voltage on said device, to effect successive discharges of said device alternately in opposite vectorial directions through said welding transformer primary.

7. A resistance welder comprising a circuit including a welding transformer, a power condenser, a source of direct current, means for charging said power condenser from said source, means for discharging said power condenser through the primary winding of said welding transformer in alternately opposite vectorial directions to effect complete demagnetization of the core of said welding transformer for the purpose of obtaining maximum efficiency of said transformer, and means for effecting a vectorially reversed storing of energy in said power condenser released by the collapse of the magnetic field in said welding transformer following each discharge of said power condenser therethrough for the purpose of retrieving said energy during successive charging of said condenser.

ALEXANDER RAVA.

REFERENCES CITED

The following references are of record in the file of this patent:

UNITED STATES PATENTS

| Number | Name | Date |
|---|---|---|
| 1,168,346 | Thomson | Jan. 18, 1916 |
| 2,179,105 | Sidney | Nov. 7, 1939 |

FOREIGN PATENTS

| Number | Country | Date |
|---|---|---|
| 859,306 | France | June 3, 1940 |